(12) United States Patent
Ichinose et al.

(10) Patent No.: US 7,383,698 B2
(45) Date of Patent: Jun. 10, 2008

(54) METHOD OF MANUFACTURING GLASS MELT AND METHOD OF MANUFACTURING MOLDED GLASS MATERIAL

(75) Inventors: Jun Ichinose, Tokyo (JP); Kazuo Ogino, Tokyo (JP); Hidetsugu Kato, Tokyo (JP)

(73) Assignee: Hoya Corporation, Tokyo (JP)

( * ) Notice: Subject to any disclaimer, the term of this patent is extended or adjusted under 35 U.S.C. 154(b) by 296 days.

(21) Appl. No.: 10/913,457

(22) Filed: Aug. 9, 2004

(65) Prior Publication Data
US 2005/0061030 A1 Mar. 24, 2005

(30) Foreign Application Priority Data
Aug. 8, 2003 (JP) ............................. 2003-289490

(51) Int. Cl.
*C03B 5/00* (2006.01)
*C03B 3/00* (2006.01)
(52) U.S. Cl. .................. 65/134.1; 65/134.6; 65/134.9; 65/135.9
(58) Field of Classification Search ............. 65/134.2, 65/134.5, 134.7, 157, 337, 346, 347, 134.1, 65/135.8
See application file for complete search history.

(56) References Cited

U.S. PATENT DOCUMENTS

| 2,625,658 | A | * | 1/1953 | Robinson | 250/576 |
|---|---|---|---|---|---|
| 3,885,945 | A | * | 5/1975 | Rees et al. | 65/135.7 |
| 4,040,846 | A | * | 8/1977 | Broemer et al. | 501/42 |
| 4,594,089 | A | * | 6/1986 | Kurata | 65/135.8 |
| 4,983,198 | A | * | 1/1991 | Ogino | 65/32.5 |
| 5,665,137 | A | * | 9/1997 | Huang | 65/134.1 |
| 6,698,244 | B1 | * | 3/2004 | Romer et al. | 65/134.3 |
| 6,739,152 | B2 | * | 5/2004 | Jeanvoine et al. | 65/346 |
| 7,010,940 | B2 | * | 3/2006 | Ogino et al. | 65/135.9 |
| 2003/0029197 | A1 | * | 2/2003 | Jeanvoine et al. | 65/157 |
| 2003/0074921 | A1 | * | 4/2003 | Ogino et al. | 65/99.2 |
| 2006/0000239 | A1 | * | 1/2006 | Jeanvoine et al. | 65/134.7 |

(Continued)

FOREIGN PATENT DOCUMENTS

JP          62-113725 A          5/1987

(Continued)

OTHER PUBLICATIONS

Laptev, Derwent 1993-310158, Sep. 15, 1992.*

*Primary Examiner*—Eric Hug
*Assistant Examiner*—DeMaris R. Wilson
(74) *Attorney, Agent, or Firm*—Sughrue Mion, PLLC

(57) ABSTRACT

A method of manufacturing glass melt and a method of manufacturing molded glass material by forming glass melt. In the method of manufacturing glass melt, the glass melt containing fluorine is prepared by melting glass raw materials and refining the resulting glass melt. The refining is conducted in a refining vat equipped with a flow inlet through which flows glass melt obtained by heating and melting the glass raw materials, and a flow outlet through which flows glass melt that has been refined, with the level of the glass melt being maintained in such a manner that the flow inlet and flow outlet remain beneath the surface of the glass melt and the glass melt does not contact external air. The method of manufacturing a molded glass material comprises the step of molding the glass melt produced by the above method.

17 Claims, 1 Drawing Sheet

U.S. PATENT DOCUMENTS

2006/0101859 A1* 5/2006 Takagi et al. ................ 65/32.5

FOREIGN PATENT DOCUMENTS

| | | |
|---|---|---|
| JP | 02-293331 A | 12/1990 |
| JP | 07-330342 A | 12/1995 |
| JP | 2000-128548 A | 5/2000 |
| JP | 2000-258227 A | 9/2000 |
| JP | 2001-137835 A | 5/2001 |

* cited by examiner

METHOD OF MANUFACTURING GLASS MELT AND METHOD OF MANUFACTURING MOLDED GLASS MATERIAL

TECHNICAL FIELD

The present invention relates to a method of manufacturing glass melt and a method of manufacturing molded glass material by forming glass melt.

BACKGROUND ART

There are known glass melting furnaces, employed in the manufacturing of high-quality glass by heating and melting glass raw materials, that are equipped with a melting vat that heats and melts glass raw materials, a refining vat in which foam is removed from glass that has been melted in the melting vat, and a homogenization vat in which the refined glass is stirred, with the various vats being connected by pipes. For example, Japanese Unexamined Patent Publication (KOKAI) No. 2000-128548 (Reference 1) discloses such a glass melting furnace.

To adequately defoam the glass, the refining vat in the glass melting furnace of Reference 1 is of prescribed shape and gas discharge holes for removing gas generated by the glass melt are provided in the upper portion of the refining vat.

Such methods of manufacturing high-quality glass by passing it through multiple vats such as a melting vat, refining vat, and homogenization vat as set forth above are suited to large-scale production because they permit the continuous manufacturing of glass.

There are broad applications for fluorine-containing glasses such as fluorophosphate glasses in the form of low-dispersion optical glasses and copper-containing near infrared radiation-absorbing glasses. There are also broad applications for fluorine and boron oxide-containing glass—a type of fluorine-containing glass—such as in copper-containing polarizing glass. Thus, fluorine-containing glasses have been put to practical use in recent years, and there is subsequently a need for their large-scale production.

Accordingly, attempts have been made to manufacture fluorine-containing glasses by utilizing the advantages of the above-described method. However, in contrast to other glasses, the manufacturing of fluorine-containing glasses by the above method presents the following problems.

When the glass melt is exposed to gas containing water vapor, the fluorine ions in the glass are replaced by oxygen ions and end up being removed from the glass as HF gas. When the quantity of fluorine ions removed from the glass is large, glass stability is lost or the Abbé number (vd) decreases, precluding use of the glass as optical glass.

To efficiently remove bubbles from the glass, refining must normally be conducted at a temperature exceeding the melting temperature of the glass, and the above-stated loss of fluorine ions and related problems become marked in the refining vat.

Accordingly, the present invention, devised to solve the above-stated problem, has for its object to provide a method of continuously manufacturing high-quality fluorine-containing glass of desired fluorine content, and a method of manufacturing molded glass material from the high-quality fluorine-containing glass continuously manufactured by this method.

SUMMARY OF THE INVENTION (1) A method of manufacturing glass melt containing fluorine by melting glass raw materials and refining the resulting glass melt, characterized in that:
  the refining is conducted in a refining vat equipped with a flow inlet through which flows glass melt obtained by heating and melting the glass raw materials, and a flow outlet through which flows glass melt that has been refined, with the level of the glass melt being maintained in such a manner that the flow inlet and flow outlet remain beneath the surface of the glass melt and the glass melt does not contact external air.

(2) The method of manufacturing glass melt according to (1) wherein the level of the glass melt in the refining vat is maintained by monitoring the level of the glass melt in a surface monitoring vat having an opening in the upper portion thereof and connected to the refining vat in such a manner that the level of the glass melt in the surface monitoring vat is identical to the level of the glass melt in the refining vat, and
  the level of the surface of the glass melt in the surface monitoring vat is monitored by directing approximately perpendicularly to the glass melt surface a monitoring light beam from the exterior of the surface monitoring vat through the opening in the upper portion of the surface monitoring vat, causing the light beam reflecting off the surface of the glass melt in the surface monitoring vat to exit through the opening, and detecting this light beam outside the surface monitoring vat.

(3) The method of manufacturing glass melt according to (2) wherein the level of the glass melt within the surface monitoring vat is controlled so that the connection opening in the surface monitoring vat connecting to the refining vat is kept constantly beneath the surface of the glass melt and the surface area of the glass melt within the surface monitoring vat is smaller than the maximum vertical cross-sectional area of the glass melt in the surface monitoring vat.

(4) The method of manufacturing glass melt according to (3) wherein the level of the glass melt within the surface monitoring vat is controlled by adjusting the shape and installation height of the surface monitoring vat.

(5) The method of manufacturing glass melt according to any of (2) to (4) wherein gas is discharged from the interior of the refining vat so that the level of the glass melt in the refining vat is identical to the level of the glass melt in the surface monitoring vat connected to the refining vat.

(6) A method of manufacturing a molded glass material comprising the step of molding the glass melt produced by the method of any of (1) to (5).

Figure 1:
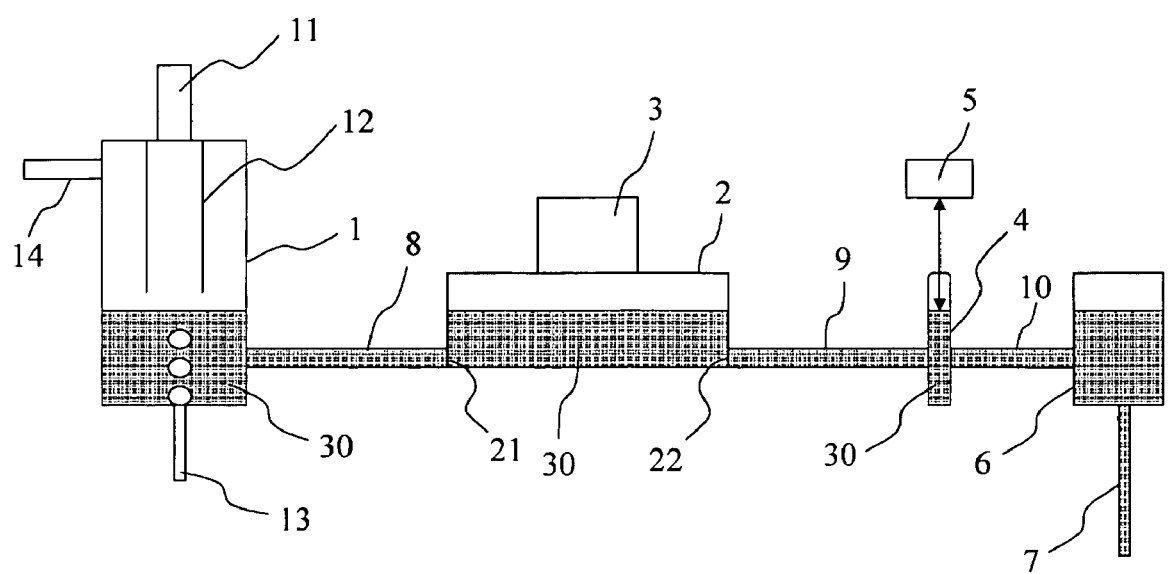
FIG. 1 is a schematic view of the cross-section of the glass melting furnace employed in the embodiments.

The present invention provides a method of continuously manufacturing high-quality fluorine-containing glass and a method of manufacturing a molded glass material comprised of high-quality fluorine-containing glass.

BEST MODE OF IMPLEMENTING THE INVENTION

Method of Manufacturing Glass Melt

In the method of manufacturing glass melt of the present invention, glass raw materials are melted and refined to obtain fluorine-containing glass melt. The present invention is further characterized in that the refining is conducted in a refining vat equipped with a flow inlet through which flows glass melt obtained by heating and melting the glass raw materials, and a flow outlet through which flows glass melt that has been refined, with the level of glass melt being maintained so that the flow inlet and flow outlet remain beneath the surface of the glass melt and the glass melt does not contact external air.

In the present invention, the fluorine-containing glass is not specifically limited. Examples are fluorophosphate glass and glass containing fluorine and boron oxide. There are broad applications for fluorophosphate glass, such as in low-dispersion optical glass and copper-containing infrared radiation-absorbing glass. There are also broad applications for glasses containing fluorine and boron oxide, such as in copper-containing polarizing glass.

Fluorine-containing glass has a property whereby, when coming into contact with ambient air containing OH groups and water vapor while in a molten state, the fluorine ions are replaced by oxygen ions and the fluorine is removed from the glass as HF gas. When the fluorine ions are replaced with oxygen ions, the stability of the glass is lost or the Abbé number (vd) is reduced, precluding use as optical glass. Further, the HF gas produced is harmful, having a negative effect on the environment if discharged as is. In the present invention, refining is conducted without the glass melt coming into contact with external air. Conducting refining in the refining vat with the glass melt isolated from the external air permits the production of fluorine-containing glass while maintaining stable optical characteristics.

Isolation of the glass melt from external air means keeping external air from entering the refining vat to prevent contact with the glass melt. So long as external air does not enter the refining vat, it is unnecessary to tightly seal the interior of the refining vat. When the refining vat is tightly sealed, bubbles floating up from within the glass melt are trapped within the refining vat, pressing against the surface of the glass melt, so continuous or intermittent discharge of the air in the upper portion of the refining vat is desirable during refining. However, the discharge of air is desirably conducted so that the pressure in the refining vat is not substantially decreased by the discharge, causing the level of the glass melt within the refining vat to surpass the level in vats connected to the refining vat. In particular, the discharge of air is desirably conducted so that the level of the glass melt is identical in each of the vats connected to the refining vat. More specifically, the discharge of air in the refining vat is desirably conducted so that the level of the glass melt in the refining vat and the level of the glass melt in the surface monitoring vat connected to the refining vat are identical.

Further, it is desirable to isolate not only the refining vat, but also the interior of the melting vat in which the glass raw materials are melted so that the glass melt does not come into contact with external air. The same holds true for other vats such as the homogenization vat.

The glass raw materials employed in the course of preparing refined glass melt by the method of the present invention may be cullets prepared by rough melting or raw materials obtained by blending multiple powdered compounds that vitrify when melted by heating.

To enhance defoaming of the glass melt in the refining vat, it is effective to heat the glass to high temperature to decrease the viscosity of the glass melt, greatly increasing the speed with which bubbles rise. In addition to increasing the surface area of the glass melt within the refining vat, rendering the glass melt suitably shallow is also effective in defoaming. Since the glass melt in the refining vat is hotter than in the melting vat and the surface thereof is broader, fluorine tends to readily volatize from the glass melt. However, isolating the glass melt in the refining vat from external air and refining it without contact with external air prevents volatization products from reacting with external air and producing aggregates, thereby avoiding the above-described problem.

In the present invention, the refining vat is equipped with a flow inlet through which glass melt from the melting vat flows in, and a flow outlet through which refined glass melt flows out. Refining is conducted while maintaining the flow inlet and the flow outlet beneath the level of the glass melt. This prevents the space above the glass melt surface within the refining vat from coming into contact with external air flowing through the flow inlet or outlet.

As stated above, it is necessary to maintain the glass melt level in at least the refining vat at a proper level in the process of manufacturing glass melt of the present invention. To that end, the level of the glass melt in the refining vat is monitored. The method of monitoring the level of the glass melt by monitoring the resistance between electrodes immersed in the glass melt is known. However, in that method, there are problems in that (1) volatization products adhering to the electrodes drop off into the glass melt, compromising quality; (2) corrosion of the electrodes precludes accurate monitoring; and (3) the corroded electrodes contaminate the glass melt. By contrast, optical monitoring of the level of the glass melt with a laser beam does not present such difficulties and is suited to the present invention. However, methods of optical level monitoring cannot be implemented without providing an opening in at least one of the vessels constituting the various vats, including the melting vat, refining vat, and homogenization vat, or the piping connecting the vats. The present invention requires that there be extremely little contact between the glass melt and external air. Accordingly, in the present invention, the level of the glass melt in the refining vat is desirably maintained by monitoring the level of the glass melt in a glass melt surface monitoring vat having an opening in the upper portion thereof and being connected to the refining vat so that the level of the glass melt is identical to that in the refining vat. Further, monitoring of the surface level of the glass melt in the surface monitoring vat is desirably conducted by directing a monitoring light beam approximately perpendicularly to the surface of the glass melt from outside the surface monitoring vat through an opening in the upper portion of the surface monitoring vat, causing the light beam reflecting off the surface of the glass melt in the surface monitoring vat to exit through the same opening, and detecting this reflected light beam outside the surface monitoring vat.

The monitoring light beam is directed onto the surface of the glass melt through the above-described opening, the light beam reflecting off the surface is made to exit back through the same opening, and the exiting light beam is picked up by an optical receiving element. The light source emitting the monitoring light beam and the optical receiving element detecting the reflected light beam are desirably both secured away from the surface monitoring vat to achieve precise monitoring. The securing of the light source and optical receiving element away from the surface monitoring vat permits monitoring of the level of, and any change in, the surface of the glass melt without the surface monitoring vat being affected by expansion or contraction. Further, the monitoring light beam is desirably directed approximately vertically so that even when the level of the glass melt varies greatly, the position of the reflected light beam in the optical receiving element does not shift greatly, permitting monitoring. This also permits a reduction in the size of the opening.

The light beam employed for monitoring is desirably a laser beam. The use of a laser beam permits a reduction in the diameter of the spot of the light beam and the use of a light beam of increased brightness. The monitoring method employed in the method of the present invention is not specifically limited; for example, the method of phase difference measurement may be employed.

Two laser beams are employed for the laser ranging sensor in the phase difference measurement method. One laser beam is employed for measurement and the other laser beam is employed for reference. The laser beam employed for measurement is emitted from a sensor head, reflects off the glass melt surface, which is the object being measured, and returns to the sensor, entering an optical receiving element within the sensor. Thus, when there is a change in distance between the sensor and the object being measured, the length of the optical path traveled by the laser beam employed for measurement changes. When a laser beam is directed perpendicularly to the surface of the glass melt and the change in the distance between the sensor and the glass melt surface is denoted as $\Delta L$, the length of the optical path of the laser beam employed for measurement changes by $2\Delta L$. The reference laser beam that is emitted by the light source is picked up by the optical element. The length of the path of the reference laser beam is fixed.

The measurement laser beam intensity and the reference laser beam intensity are intensity modulated at fixed amplitudes A, A' and frequency f. For example, let the intensity of the measurement laser beam be:

$I_1 = A \sin(2\pi ft + \phi)$ and the intensity of the reference laser beam be:

$I_2 = A' \sin(2\pi ft)$ where $\phi$ corresponds to the phase difference between the two laser beams. Bother laser beams are picked up by a single receiving element. The receiving element compares the optical intensities and outputs an electrical signal. Thus, the output signal of the optical receiving element denotes temporal change proportional to $A \sin(2\pi ft + \phi) + A' \sin(2\pi ft)$.

The change $\Delta\phi$ in the above phase difference can be expressed as $4\pi f \cdot \Delta L/c$ (where c denotes the speed of light) for the change in the optical path length $2\Delta L$ of the measurement laser beam. Accordingly, it is possible to analyze $\Delta\phi$ from the output signal of the light receiving element and compute $\Delta L$.

In actual measurement, the distance L serving as reference is measured in advance and the phase difference $\phi$ at that time is computed. A subsequent change in distance $\Delta L$ then appears as a change $\Delta\phi$ in phase difference, revealing the actual distance $L + \Delta L$.

The higher modulation frequency f becomes, the larger $\Delta\phi$ becomes relative to $\Delta L$, enhancing measurement precision. However, in the present invention, modulation frequency f desirably falls within a range of from $10^2$ to $10^3$ MHz, preferably within a range of from 200 to 400 MHz, and more preferably within a range of from 300 to 450 MHz. This method permits measurement at a resolution of ±0.5 mm. The laser beam light sources are desirably both semiconductor lasers. Intensity modulation can be achieved by inputting a high-frequency signal oscillating at frequency f to the laser drive circuit to drive the semiconductor lasers. The optical receiving element must be able to handle frequencies suitably higher than modulation frequency f. From this perspective, the optical receiving element is desirably a PIN photodiode. The wavelengths of the measurement laser beam and reference laser beam desirably fall within a range of from 600 to 850 nm; different wavelengths are selected for the two laser beams.

In high-precision measurement, the modulation frequency is desirably stabilized, the laser output is desirably stabilized, and the intensity of the measurement laser beam and the intensity of the reference laser beam in the optical receiving element are desirably optimized.

It is possible to configure a circuit analyzing the phase difference change $\Delta\phi$ from the output signal of the optical receiving element in the form of a frequency conversion circuit converting the signal frequency to a low frequency with the phase difference remaining unchanged by a method called the beat-down method, and in the form of an analysis circuit based on known methods by combining automatic gain control amplifiers and phase comparison circuits to permit optimal processing even when the level of light received varies.

The distance between the laser ranging sensor and the surface of the glass melt desirably falls within a range of from 1 to 6 m, preferably a range of from 3 to 6 m, and more preferably, a range of from 3 to 5 m. Small distances translate into high sensor temperatures and impede accurate measurement. Since the sensor is exposed to high temperature when separated from the glass melt by precisely the above-stated distance, the sensor head is desirably cooled, with a combination of water and air cooling being preferred. By contrast, an excessively great distance tends to impede accurate measurement due to external disruption.

In contrast to triangulation measurement methods, the method in which the laser beam strikes perpendicularly such as set forth above affords advantages in that the opening in the melt vessel can be made extremely small, as well as the following.

When producing glass at a glass melt level denoted as a and then later shifting to production at a glass melt level denoted as b, in the triangulation measurement method, when a and b begin to differ substantially and the angles and positions of the sensors (both the light emitting and light receiving elements) are not adjusted, the light does not correctly enter the optical receiving element. Further, the opening in the vessel must be enlarged so that the optical path is not impeded. However, in the method of the present invention employing approximately vertical light, this problem does not occur because the light constantly returns to the optical receiving element.

Further, since there are times when volatile gases from the glass escape continuously through the opening in the vessel, it is sometimes effective for accurate and stable glass melt monitoring to cause a gas to flow in the vicinity of the opening to blow off volatile gases in a manner not impeding the laser beam.

Further, the glass melt emits intense light because it is at high temperature. Since the light (including infrared radiation and the like) given off by the glass enters the optical receiving element along with the monitoring laser beam, the light is desirably passed through a filter before entering the optical receiving element to eliminate the effects of light emitted by the glass.

The level of the glass melt within the surface monitoring vat is desirably controlled so that the connection opening between the refining vat and the glass melt surface monitoring vat is always below the surface of the glass melt and the surface area of the glass melt in the surface monitoring vat is smaller than the maximum vertical cross-sectional area of the glass melt in the surface monitoring vat. Keeping the connection opening constantly below the surface of the glass melt limits the surface coming into contact with external air to the surface of the glass melt within the monitoring vat. Making the surface area of the glass melt in the surface monitoring vat smaller than the maximum vertical cross-sectional area of the glass melt reduces the surface area coming into contact with external air per unit of volume of the glass melt, reducing the effects of volatization. The level of the glass melt within the surface monitoring vat can be controlled by adjusting the shape and installation height of the surface monitoring vat.

To reduce volatization of the glass melt, the temperature of the glass melt in the surface monitoring vat is desirably made lower than the temperature of the glass melt in the refining vat.

The refining vat and surface monitoring vat in the present invention are desirably made of platinum. Platinum as referred to here includes the platinum alloys, such as reinforced platinum, that are commonly employed with glass melt. The melting vat is also desirably made of platinum.

The method disclosed in Japanese Unexamined Patent Publication (KOKAI) No. 2002-128528 can be employed to melt fluorophosphate glass and boron oxide-containing glass in the melting vat.

The present invention is suited to methods of refining glass melt while feeding and melting glass raw materials, methods of refining glass melt while causing glass melt to flow out, and methods of refining glass melt while supplying and feeding glass raw materials and causing glass melt to flow out.

The present invention is suited to the manufacturing of high-quality glass, and is thus suited to the manufacturing of optical glass employed in components such as lenses, prisms, filters, the cover glass of optical pickup elements, diffraction gratings, and the like.

Method of Manufacturing Molded Glass Material

The method of manufacturing molded glass material of the present invention is characterized by comprising the steps of causing a glass melt manufactured by the above-described method to flow out and molding the glass that flows out.

The glass melt is desirably caused to flow out of a flow pipe made of platinum. The temperature of the flow pipe is also desirably adjusted to prevent devitrification of the glass melt.

The relation between the feeding and flow rate of the glass raw materials is also desirably adjusted so that the level of the glass melt is constant and a constant outward flow rate is achieved.

A number of examples of the molding of glass melt continuously flowing out of a pipe at a constant speed will be given.

In the first method, the outward flowing glass melt is cast in a casting mold to mold sheet glass. The molded sheet glass is annealed and cut into pieces of prescribed weight to prepare a material for press molding known as "cut pieces".

In the second method, a quantity of glass melt corresponding to the weight of a piece of targeted molded glass material is separated from the glass melt flow, molded into desired shape while still soft, and cooled. The molded glass material can be reheated and press molded to manufacture optical elements such as lenses, prisms, and diffraction gratings. The surface of the molded glass material can also be processed by polishing prior to reheating and press molding. Glass material that has been press molded can also be processed by polishing to finish the optical element.

In the third method, glass melt corresponding to the weight of the targeted molded glass material is separated from the outflowing glass melt and the separated glass is press molded while still in a softened state. The press molded articles may also be suitably processed by grinding and polishing.

All of the above-described methods are suited to the manufacturing of optical elements.

EMBODIMENTS

Embodiment 1

Embodiments will be described below with reference to the drawings.

FIG. 1 is a schematic view of a cross-section of a glass melting furnace employed in the present embodiment.

A glass raw material introduction opening 11 is provided in the upper portion of a melting vat 1 of platinum, through which a glass raw material obtained by blending multiple powdered compounds of various types is introduced to glass melt accumulating in the melting vat.

Fluorophosphate glass, a typical fluorine-containing glass, is an optical glass in which fluorine is used to raise the Abbé number (vd) and that exhibits a high degree of positive anomalous dispersivity. The raw materials are a fluorine compound MFx and a metaphosphate compound M' $(PO_3)$ x'. Here, M and M' each denote a metal element such as an alkali metal element or alkaline earth metal element, or one or multiple metal elements selected from among other metal elements. x and x' denote the valence numbers of M and M'. Examples of these raw materials are blends of aluminum fluoride $AlF_3$, magnesium fluoride $MgF_2$, calcium fluoride $CaF_2$, strontium fluoride $SrF_2$, yttrium fluoride $YF_3$ (hereinafter, "fluoride compounds"); and aluminum metaphosphate $Al(PO_3)_3$, barium metaphosphate $Ba(PO_3)_2$ (hereinafter, "metaphosphate compounds"). Further examples are $KPO_3$, $NaPO_3$, $H_3PO_4$, $P_2O_5$, and $Nd_2(PO_3)_3$. These glass raw materials are introduced into glass melt in a vessel heated to 800 to 1,000° C. When manufacturing boron oxide-containing glass, it suffices to employ boric acid as a raw material.

The introduction passage of the glass raw materials is enclosed by a partition 12 of platinum. Dry oxygen gas is bubbled from a gas delivery pipe 13 connected to the bottom of the melting vat at the position where the raw materials are introduced. Along with stirring the glass melt and raw materials that are introduced, bubbling functions to oxidize the highly reductive products produced during the thermal decomposition of the glass raw materials. For example, the use of a metaphosphate compound as a raw material produces extremely reductive highly free phosphorus during the melting process. When this phosphorus contacts the internal walls of the melting vat, it corrodes the platinum, causing platinum to mix into the glass and damaging the melting vat. Introducing the raw materials at a position where a dry oxidizing gas such as oxygen is bubbling quickly oxidizes the free phosphorus and eliminates the problem of platinum corrosion.

A pipe, not shown, supplying dry gas to the melting vat is connected near the raw material introduction opening, causing dry gas to flow along the raw material introduction passage. The dry gas passes through a gap between the lower end of the partition and the surface of the glass melt, flowing into the area between the outer surface of the partition and the inner wall of the melting vat. The dry gas is discharged through dry gas discharge outlet 14 to the exterior of the melting vat. The flow of dry gas removes to the exterior of the melting vat water vapor and gas generated by the decomposition of the raw material, and prevents raw materials from wafting up during their introduction.

The glass melt 30 produced in melting vat 1 passes through platinum connecting pipe 8 and is delivered to platinum refining vat 2. Refining vat 2 is designed so that the glass melt surface area within the vat is substantially larger than the vertical cross-sectional area of the glass melt to enhance the defoaming effect. The temperature in refining vat 2 is set higher than the temperature in melting vat 1 to facilitate defoaming. Within refining vat 2 are provided a glass melt flow inlet 21 and flow outlet 22 for separating the glass melt 30 within the vat from external air, and a discharge device 3 discharging gas from the interior of the refining vat to the exterior of the vat. When glass melt accumulates within the vat, the glass melt surface within the vat is isolated from exterior air.

Glass melt 30 that has been refined within the refining vat passes through connecting pipe 9 and is delivered to glass melt surface monitoring vat 4. Surface monitoring vat 4 is shaped so that the maximum vertical cross-sectional area (the vertical cross-sectional area in the center) is substantially larger than the horizontal cross-sectional area, with the temperature within the vat being set lower than the temperature in the refining vat. The level of the glass melt surface is monitored by a laser ranging sensor 5 secured at some distance from the monitoring vat above surface monitoring vat 4. A laser beam emitted by sensor 5 is directed approximately perpendicularly onto the surface of the glass melt through an opening provided in the upper portion of the surface monitoring vat, reflecting off the surface. The reflecting beam then passes back through the same opening, exiting the vat and reaching the optical receiving element of sensor 5. The level of the glass melt surface is determined from the position of the laser beam that is received. Although the glass melt does come into contact with exterior air in the surface monitoring vat, the area coming into contact with exterior air per unit volume is smaller than in the refining vat, so the effect of contact with exterior air on the glass melt is minimized.

Glass melt 30 passes through connecting pipe 10 from surface monitoring vat 4, arriving at homogenization vat 6. Homogenization vat 6 contains a stirring rod, not shown, on the interior, homogenizing the glass within the vat by stirring. The stirred glass passes through a flow pipe 7 provided in the bottom of the homogenization vat, flowing to the exterior of the melting furnace.

The melting vat, refining vat, surface monitoring vat, homogenization vat, connection piping connecting the various vats, and the flow pipe are all made of platinum and can be heated to adjust the temperature.

The surface level of the glass melt in the melting vat, refining vat, surface monitoring vat, and homogenization vat is made identical. Thus, when discharging gas from the interior of the refining vat, the pressure within the refining vat is kept about the same as atmospheric pressure. Making the level in each of the vats identical in this manner makes it possible to determine the level in all other vats simply by monitoring the level in the surface monitoring vat. In the present embodiment, the surface monitoring vat is positioned between the refining vat and the homogenization vat, but can also be positioned between the melting vat and the refining vat.

Based on the monitored level of the glass melt, glass raw materials are introduced in such a manner that the surface of the glass melt in the melting vat does not reach the lower edge of the partition, the various connecting pipe and vat connection openings remain completely submerged below the surface of the glass melt, and the flow rate of the glass melt flowing out of the flow pipe remains constant. Fluorophosphate glass was caused to flow out in this manner. As a result, glass having stable optical characteristics in the form of a fluctuation in refractive index (nd) of $60 \times 10^{-5}$ over a range from maximum to minimum and a fluctuation in an Abbé number (vd) of 0.4 over a range from maximum to minimum was produced from hour 12 to hour 24 after the start of melting.

Comparative Example 1

When fluorine-containing glass was continuously melted in a melting furnace without isolation from exterior air, platinum foreign material and devitrified material from 10 to 50 micrometers in size were produced in the glass from the start of manufacturing to hour 60, precluding the manufacturing of product. In the 24 hours following hour 60, measurements taken once each hour revealed a fluctuation in refractive index (nd) with a range from maximum to minimum of $150 \times 10^{-5}$ and a fluctuation in Abbé number (vd) of 1.0 over a range from maximum to minimum, making it difficult to stabilize optical characteristics.

The above mentioned platinum foreign material was thought to be the result of oxidization of the platinum vessel in which the fluorine in the glass underwent a substitution reaction with oxygen, and the devitrified material was thought to be the precipitation of crystal grains in the glass resulting from decreased stability of the glass due to this substitution.

Embodiment 2

The molten fluorophosphate glass manufactured by the method of Embodiment 1 was made to flow out of a flow pipe at a constant flow rate into a casting mold and sheet glass comprised of the fluorophosphate glass was molded. The sheet glass was annealed and cut into prescribed shape to produce cut glass.

Next, the cut glass was reheated and press molded in a pressing mold to obtain a lens-shaped molded product. The molded product was ground and polished to manufacture lenses of low-dispersion optical glass. The lens obtained exhibited the desired optical characteristics.

Embodiment 3

Molten copper-containing fluorophosphate glass manufactured by the method of Embodiment 1 was made to flow out of a flow pipe at a constant flow rate into a casting mold, and sheet glass comprised of fluorophosphate glass was molded. The sheet glass was annealed, sliced to prescribed thickness, and optically polished to manufacture the color-compensating filter of a solid-state image pickup element having a near infrared radiation-absorbing function. As a result, it was possible to obtain color-compensating filter glass for solid-state image pickup elements having an external transmittance of greater than or equal to 85 percent at a wavelength of 400 nm and an external transmittance of less than or equal to 22 percent at a wavelength of 1,200 nm as calculated based on conversion to a thickness of 0.45 mm. Due to high transmittance at a wavelength of 400 nm and low transmittance at a wavelength of 120 nm, a good color-compensation function was achieved.

When copper-containing fluorophosphate glass was prepared without separation from external air in Comparative Example 1, volatization of the fluorine caused a drop in overall transmittance. Glass for color-compensating filters desirably exhibits high transmittance at a wavelength of 400 nm and low transmittance at a wavelength of 1,200 nm. However, volatization of the fluorine caused a drop in external transmittance at a wavelength of 400 nm, making it difficult to obtain glass affording a good color-compensating function.

Embodiment 4

Fluorophosphate glass melt obtained by the method of Embodiment 1 was made to flow out of a flow pipe, supplied onto the molding surface of a lower mold, and molded into a lens shape by pressing with an upper mold opposite the lower mold. The molded product was ground and polished to produce a lens comprised of low-dispersion optical glass. The lens obtained exhibited the desired optical characteristics.

The present disclosure relates to the subject matter contained in Japanese Patent Application No. 2003-289490 filed on Aug. 8, 2003, which is expressly incorporated herein by reference in its entirety.

What is claimed is:

1. A method of manufacturing glass melt comprising:
   melting glass raw materials including materials containing fluorine; and
   refining the resulting glass melt, wherein:
   the refining is conducted in a refining vat equipped with a flow inlet through which flows glass melt obtained by heating and melting the glass raw materials, and a flow outlet through which flows glass melt that has been refined, with the level of the glass melt being maintained in such a manner that the flow inlet and flow outlet remain beneath the surface of the glass melt and the glass melt does not contact external air, and
   wherein a gas is discharged from an interior of the refining vat in such a manner that the pressure within the refining vat is kept about the same as atmospheric pressure.

2. The method of manufacturing glass melt according to claim 1, wherein the level of the glass melt in the refining vat is maintained by monitoring the level of the glass melt in a surface monitoring vat having an opening in the upper portion thereof and connected to the refining vat in such a manner that the level of the glass melt in the surface monitoring vat is identical to the level of the glass melt in the refining vat, and
   the level of the surface of the glass melt in the surface monitoring vat is monitored by directing approximately 90 degrees to the glass melt surface a monitoring light beam from the exterior of the surface monitoring vat through the opening in the upper portion of the surface monitoring vat, causing the light beam reflecting off the surface of the glass melt in the surface monitoring vat to exit through the opening, and detecting this light beam outside the surface monitoring vat.

3. The method of manufacturing glass melt according to claim 2, wherein the level of the glass melt within the surface monitoring vat is controlled so that the connection opening in the surface monitoring vat connecting to the refining vat is kept constantly beneath the surface of the glass melt and the surface area of the glass melt within the surface monitoring vat is smaller than the maximum vertical cross-sectional area of the glass melt in the surface monitoring vat.

4. The method of manufacturing glass melt according to claim 3, wherein the level of the glass melt within the surface monitoring vat is controlled by adjusting the shape and installation height of the surface monitoring vat.

5. The method of manufacturing glass melt according to claim 2, wherein gas is discharged from the interior of the refining vat so that the level of the glass melt in the refining vat is identical to the level of the glass melt in the surface monitoring vat connected to the refining vat.

6. The method of manufacturing glass melt according to claim 3, wherein gas is discharged from the interior of the refining vat so that the level of the glass melt in the refining vat is identical to the level of the glass melt in the surface monitoring vat connected to the refining vat.

7. The method of manufacturing glass melt according to claim 4, wherein gas is discharged from the interior of the refining vat so that the level of the glass melt in the refining vat is identical to the level of the glass melt in the surface monitoring vat connected to the refining vat.

8. A method of manufacturing a molded glass material comprising the step of molding the glass melt produced by the method of claim 1.

9. A method of manufacturing a molded glass material comprising the step of molding the glass melt produced by the method of claim 2.

10. A method of manufacturing a molded glass material comprising the step of molding the glass melt produced by the method of claim 3.

11. A method of manufacturing a molded glass material comprising the step of molding the glass melt produced by the method of claim 4.

12. A method of manufacturing a molded glass material comprising the step of molding the glass melt produced by the method of claim 5.

13. A method of manufacturing a molded glass material comprising the step of molding the glass melt produced by the method of claim 6.

14. A method of manufacturing a molded glass material comprising the step of molding the glass melt produced by the method of claim 7.

15. A method of manufacturing a glass melt containing fluorine comprising:
   melting glass raw materials including materials containing fluorine; and
   refining the resulting glass melt, wherein:
   the refining is conducted in a refining vat equipped with a flow inlet through which flows glass melt obtained by heating and melting the glass raw materials, and a flow outlet through which flows glass melt that has been refined, and comprises: maintaining the level of the glass melt in such a manner that the flow inlet and flow outlet remain beneath the surface of the glass melt and the glass melt does not contact external air, and
   maintaining the level of the glass melt in the refining vat by monitoring the level of the glass melt in a surface monitoring vat having an opening in the upper portion thereof and connected to the refining vat in such a manner that the level of the glass melt in the surface monitoring vat is identical to the level of the glass melt in the refining vat;

wherein a gas is discharged from an interior of the refining vat in such a manner that the pressure within the refining vat is kept about the same as atmospheric pressure.

16. The method of manufacturing glass melt according to claim 15, wherein a pressure within the refining vat is the same as a pressure within the surface monitoring vat.

17. The method of manufacturing glass melt according to claim 16, wherein an area of a top surface of the glass melt within the refining vat is larger than an area of a top surface of the glass melt within the surface monitoring vat.

* * * * *